(12) United States Patent
Petter

(10) Patent No.: US 8,792,259 B2
(45) Date of Patent: *Jul. 29, 2014

(54) METHODS, SYSTEMS, AND SOFTWARE FOR CONTROLLING A POWER CONVERTER DURING LOW (ZERO)-VOLTAGE RIDE-THROUGH CONDITIONS

(71) Applicant: Northern Power Systems Utility Scale, Inc., Barre, VT (US)

(72) Inventor: Jeffrey K. Petter, Williston, VT (US)

(73) Assignee: Northern Power Systems, Inc., Barre, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,458

(22) Filed: May 29, 2013

(65) Prior Publication Data

US 2013/0286696 A1    Oct. 31, 2013

Related U.S. Application Data

(63) Continuation of application No. 13/468,524, filed on May 10, 2012, now Pat. No. 8,467,205, which is a continuation of application No. 13/275,362, filed on Oct. 18, 2011.

(60) Provisional application No. 61/422,451, filed on Dec. 13, 2010, provisional application No. 61/425,510, filed on Dec. 21, 2010.

(51) Int. Cl.
  *H02H 7/122*  (2006.01)
  *H02H 1/06*  (2006.01)

(52) U.S. Cl.
  USPC .............................. 363/55; 361/52

(58) Field of Classification Search
  USPC ............. 290/44, 55; 307/31, 33, 35, 60, 102, 307/103; 363/50, 55, 74, 95; 361/42, 47, 361/52, 76, 85, 110; 327/156
  See application file for complete search history.

(56) References Cited

U.S. PATENT DOCUMENTS

| 5,239,251 | A  | 8/1993 | Lauw |
| 6,285,533 | B1 | 9/2001 | Sakamoto |

(Continued)

FOREIGN PATENT DOCUMENTS

| WO | 03058789 | 7/2003 |
| WO | 2004008627 | 1/2004 |
| WO | 2004070936 | 8/2004 |
| WO | 2005031941 | 4/2005 |

OTHER PUBLICATIONS

Reexamination Application Control No. 95/000,633 of U.S. Patent No. 7,629,705 filed May 24, 2011; Method and Apparatus for Operating Electric Machines, Sidney A. Baker et al.

(Continued)

*Primary Examiner* — Gary L Laxton
(74) *Attorney, Agent, or Firm* — Downs Rachlin Martin PLLC

(57) ABSTRACT

Software embodied in a machine-readable storage medium and useful for controlling alternating-current (AC) output of a power converter connected to an AC power network. The software is designed and configured to estimate the phase of the voltage on the AC power network that will be on the network when the network recovers from a fault. Such software allows a power-network-connected power source to ride-through a fault event and continue supplying power thereto at the designed phase and frequency. In one embodiment, the software provides this estimate by tracking the phase with a response time changed in inverse proportion to the voltage on the power network.

17 Claims, 7 Drawing Sheets

(56) References Cited

U.S. PATENT DOCUMENTS

| | | | |
|---|---|---|---|
| 6,531,926 | B1 | 3/2003 | Pate et al. |
| 6,784,565 | B2 | 8/2004 | Wall et al. |
| 6,919,650 | B2 | 7/2005 | Deng |
| 7,525,208 | B2 | 4/2009 | Wobben |
| 7,535,120 | B2 | 5/2009 | Erdman et al. |
| 7,607,896 | B2 | 10/2009 | Leuthen et al. |
| 7,629,705 | B2 | 12/2009 | Barker et al. |
| 7,940,131 | B2 | 5/2011 | Weng et al. |
| 8,014,181 | B2 | 9/2011 | Tan et al. |
| 8,067,932 | B2 | 11/2011 | Teodorescu et al. |
| 8,467,205 | B2 * | 6/2013 | Petter .............................. 363/55 |
| 2004/0145188 | A1 | 7/2004 | Janssen et al. |
| 2004/0207206 | A1 | 10/2004 | Wobben |
| 2005/0122083 | A1 | 6/2005 | Erdman et al. |
| 2007/0132248 | A1 | 6/2007 | Weng et al. |
| 2009/0079193 | A1 | 3/2009 | Nielsen et al. |
| 2010/0308584 | A1 * | 12/2010 | Coates et al. ................... 290/44 |
| 2012/0169059 | A1 | 7/2012 | Beekmann et al. |

OTHER PUBLICATIONS

Kaura, Operation of a Phase Locked Loop System Under Distorted Utility Conditions, IEEE Transactions on Industry Applications, vol. 33, No. 1, pp. 58-63, published Jan./Feb. 1997.

Milasi, A Novel Adaptive Gain-Scheduling Controller for Synchronous Generator, R. Mohammadi-Milasi, et al., Proceedings of the 2004 IEEE International Conference on Control Applications, Taipei, Taiwan, Sep. 2-4, 2004.

E.On 2003, E.On Netz Grid Code: High and extra high voltage, E.On Netz GmbH, Bayreuth, Germany, Aug. 2003.

FERC, United States of America Federal Energy Regulatory Commission: Order No. 661-A, Dec. 12, 2005.

Windfarm, Wind Farm Integration in British Columbia—Stages 1 and 2: Planning and Interconnection Criteria, Electric System Consulting, ABB Inc., Mar. 28, 2005.

Best 2D Ed., Phase-Locked-Loops: Design, Simulation, and Application, Best, Roland E., 2nd edition, 1993.

Best 4th Ed., Phase Locked-Loops: Design, Simulation, and Application, Best, Roland E., 4th edition, 1999.

E.On 2001, E.On Netz: Supplemental Network Connection Rules for Wind Energy Systems, E.On Netz GmbH, Dec. 1, 2001.

Office Action dated Aug. 31, 2012, in connection with related U.S. Appl. No. 13/468,524, filed May 10, 2012, Petter.

Response to Office Action dated Nov. 29, 2012, in connection with related U.S. Appl. No. 13/468,524, filed May 10, 2012, Petter.

Office Action dated Dec. 10, 2012, in connection with related U.S. Appl. No. 13/468,524, filed May 10, 2012, Petter.

Response to Office Action dated Jan. 10, 2013, in connection with related U.S. Appl. No. 13/468,524, filed May 10, 2012, Petter.

* cited by examiner

METHODS, SYSTEMS, AND SOFTWARE FOR CONTROLLING A POWER CONVERTER DURING LOW (ZERO)-VOLTAGE RIDE-THROUGH CONDITIONS

RELATED APPLICATION DATA

This application is a continuation application of Ser. No. 13/468,524, filed May 10, 2012, and titled "Methods, Systems, and Software for Controlling a Power Converter During Low (Zero)-Voltage Ride-Through Conditions", which is a continuation application of U.S. patent application Ser. No. 13/275,362, filed Oct. 18, 2011 (now abandoned), and titled "Methods, Systems, and Software for Controlling a Power Converter During Low (Zero)-Voltage Ride-Through Conditions," which claims the benefit of priority of U.S. Provisional Application Ser. No. 61/422,451, filed on Dec. 13, 2010, and titled "Method And System For Controlling A Power Converter During Voltage Faults And Surges" and U.S. Provisional Application Ser. No. 61/425,510, filed on Dec. 21, 2010, and titled "Inverter Control For Fast Voltage Mitigation And Zero Voltage Ride-Through." Each of these applications is incorporated herein by reference in its entirety.

FIELD OF THE INVENTION

The present invention generally relates to the field of power electronics. In particular, the present invention is directed to methods, systems, and software for controlling a power converter during low(zero)-voltage ride-through conditions.

BACKGROUND

Occasionally, a disturbance occurs on a utility system, or other power network, that results in a significant voltage drop for a short duration (typically less than 500 ms). Such a disturbance is generally caused by a fault some place in the transmission or distribution system. Faults can be caused, for example, by a single phase conductor being inadvertently connected to ground or the inadvertent connection or short circuiting of multiple phase conductors. These types of faults commonly occur due to equipment failure, bad weather, a vehicular accident, etc. A significant reduction in voltage, sometimes referred to as a sag, can also occur when a large electrical load is energized, such a large motor, or when a large power plant is suddenly disconnected. Smaller faults, sometimes referred to as "dips," may also occur as a result of other events such as, for example, the switching of capacitors. In any event, whether the fault is large or small, the fault precipitates low-voltage or zero-voltage conditions at various points on the power network.

Managing how a power source supplying power to the power network reacts to low-voltage or zero-voltage events is an important consideration for power source operators. FIG. 1 is an exemplary plot 10 of the voltage level over time across the AC terminals of a power source, such as a wind power unit, connected to a utility grid for an exemplary voltage disturbance caused by a fault. In this example, the fault occurs at approximately time 14, here at t=0.00 seconds, at some electrical distance from the power source, and with the voltage beginning to recover at time 18, here at t~0.30 seconds. In general, and as shown in FIG. 1, faults cause a generally square-shaped dip or sag 20 in the voltage level between the pre-fault voltage level 24 and the voltage level during recovery 28. It is noted that since a utility grid is a complex impedance network of transmission lines and generators, the actual voltage after the fault tends to overshoot and ring around the utility grid's operating voltage, as illustrated by recovery 28. Those skilled in the art will appreciate that the depth of the voltage dip or sag 20 is generally related to the distance, electrically speaking, between power source and the fault locations. Closer faults cause deeper dips and sags.

For smaller power sources, such as individual wind power units and small wind farms, domestic solar systems, diesel generators, etc., it has been acceptable and desirable (for the owners of the smaller power sources) for the power source to go offline when a voltage reduction of a certain magnitude and of a certain duration occurs. Generally, this operational construct has been acceptable because the total amount of power being provided by the smaller power sources has been relatively small in comparison with the total amount of power provided by other power sources on the power network, such as coal burning power plants, nuclear power plants, etc. Because of this relatively small power producing capability, going offline had little, if any, impact on the recovery ability of the power network after a fault occurred.

As the amount of power coming from these smaller power sources on power networks has been increasing, maintaining their input during, and especially after, a fault or surge has become increasingly important because the repercussions associated with a fault can be exacerbated by a significant amount of power generating capacity going offline in response to the fault. Problems such as frequency swings or large system-wide instabilities of power-generating systems can lead to the disruption of power to large regions, affecting large numbers of power customers. Thus, utility operators (and regulators, see, e.g., Federal Energy Regulatory Commission (FERC) Order 661-A (issued Dec. 12, 2005)) are beginning to require that power sources on their power networks remain online and "ride through" low-voltage and zero-voltage conditions—requirements traditionally applied to common utility power sources, such as fossil-fueled power plants.

SUMMARY OF THE DISCLOSURE

In one implementation, the present disclosure is directed to a machine-readable storage medium containing machine-executable instructions for performing a method of controlling an alternating-current (AC) output of a power converter connected to an AC power network subject to a voltage fault that causes a network voltage on the AC power network to drop below a normal operating level during a fault period. The machine-executable instructions includes a first set of machine-executable instructions for estimating a phase angle of a voltage anticipated to be present on the AC power network when the network voltage recovers from the voltage fault; and a second set of machine-executable instructions for controlling a current of the AC output during the voltage fault as a function of the phase angle estimated; wherein the network voltage has an amplitude and the first set of machine-executable instructions includes machine-executable instructions for tracking the phase with a response time and machine-executable instructions for changing the response time in inverse proportion to the amplitude of the network voltage.

In another implementation, the present disclosure is directed to a machine-readable storage medium containing machine-executable instructions for performing a method of controlling an alternating-current (AC) output of a power converter connected to an AC power network having a frequency and subject to a voltage fault that causes a network voltage on the AC power network to drop below a normal operating level during a fault period to be ridden through, wherein the power converter is required to remain connected to the AC power network during a maximum ride-through fault period having a very low voltage time. The machine-executable instructions include a first set of machine-executable instructions for estimating a phase angle of a voltage anticipated to be present on the AC power network when the network voltage recovers from the voltage fault; and a second set of machine-executable instructions for controlling a current of the AC output during the voltage fault as a function of the phase angle estimated; wherein the first set of machine-executable instructions includes machine-executable instructions that assume that the frequency of the AC power network does not change during the fault period by utilizing a frequency tracking time constant greater than the very low voltage time.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 2:
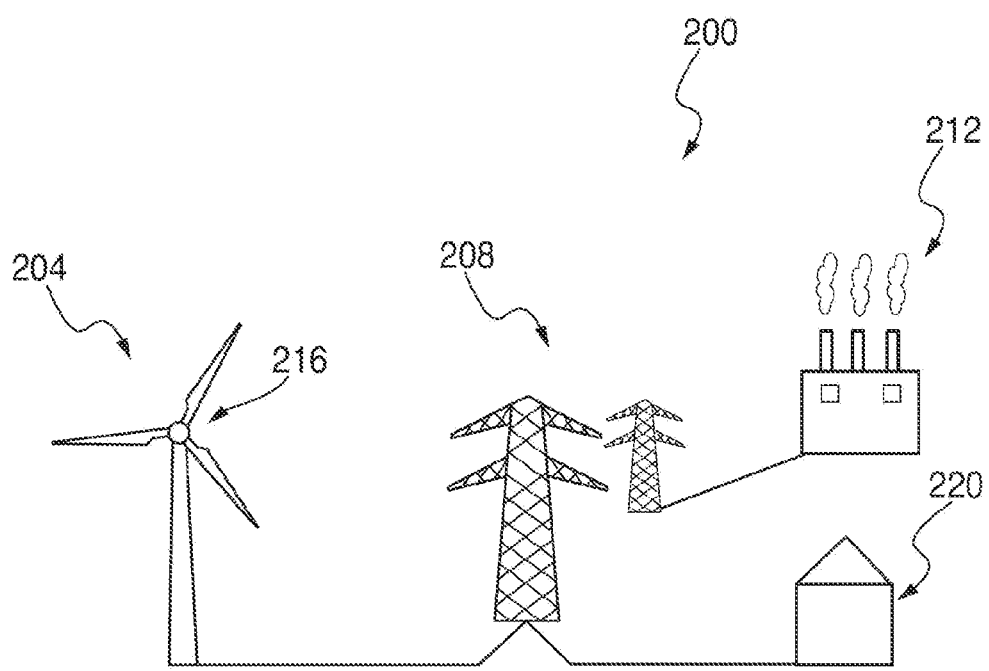
FIG. 2 is a schematic diagram of a power network having a plurality of power sources connected to a utility grid, including a wind power unit (WPU) connected to the grid according to an embodiment of the present invention.

Referring now to FIG. 2, this figure illustrates an exemplary alternating current (AC) power system 200 that includes a wind power unit (WPU) 204 that delivers electrical energy to a power network 208, which is also supplied power by one or more additional power sources, such as a coal fired power plant 212. A power converter 216 is coupled between WPU 204 and power network 208 for controlling electrical characteristics of the power delivered by the WPU to the network and that is ultimately delivered to end users, for example, utility customers, collectively represented in FIG. 2 by element 220. As described below in detail, power converter 216 provides ride-through capabilities for WPU 204 during certain events that result in low voltage and/or zero voltage on power network 208. In other words, power converter 216 is designed and configured to allow WPU 204 to remain connected, and continue supplying power, to power network 208 during such events. In this manner, power converter 216 can provide support and stability for AC power system 200 by assisting in the stabilization of the voltage on power network 208 during smaller voltage drops and improving the recovery of the network after larger faults.

Although the present disclosure focuses on WPUs, it will be readily apparent to persons of ordinary skill in the art that certain embodiments of the present invention apply to virtually any device using a four quadrant power converter system. Thus, for example, aspects of the present invention may be applied to power generators such as, but not limited to, WPUs, solar power generators, fuels cells, micro-turbines, or flow batteries; energy storage systems such as, but not limited to, batteries, ultra-capacitors, superconducting energy storage, or flywheels; and loads, such as, but not limited to, electronic ballasted lighting systems, motor drives, etc. AC power system 200 can be, for example, a conventional utility grid or an isolated power network. Power converter 216 works for both single and multi-phase systems. In power networks containing groups of WPUs or other power generators, the energy output of a plurality of generators can have their power output controlled by a single inverter control system configured as described herein.

Figure 3:
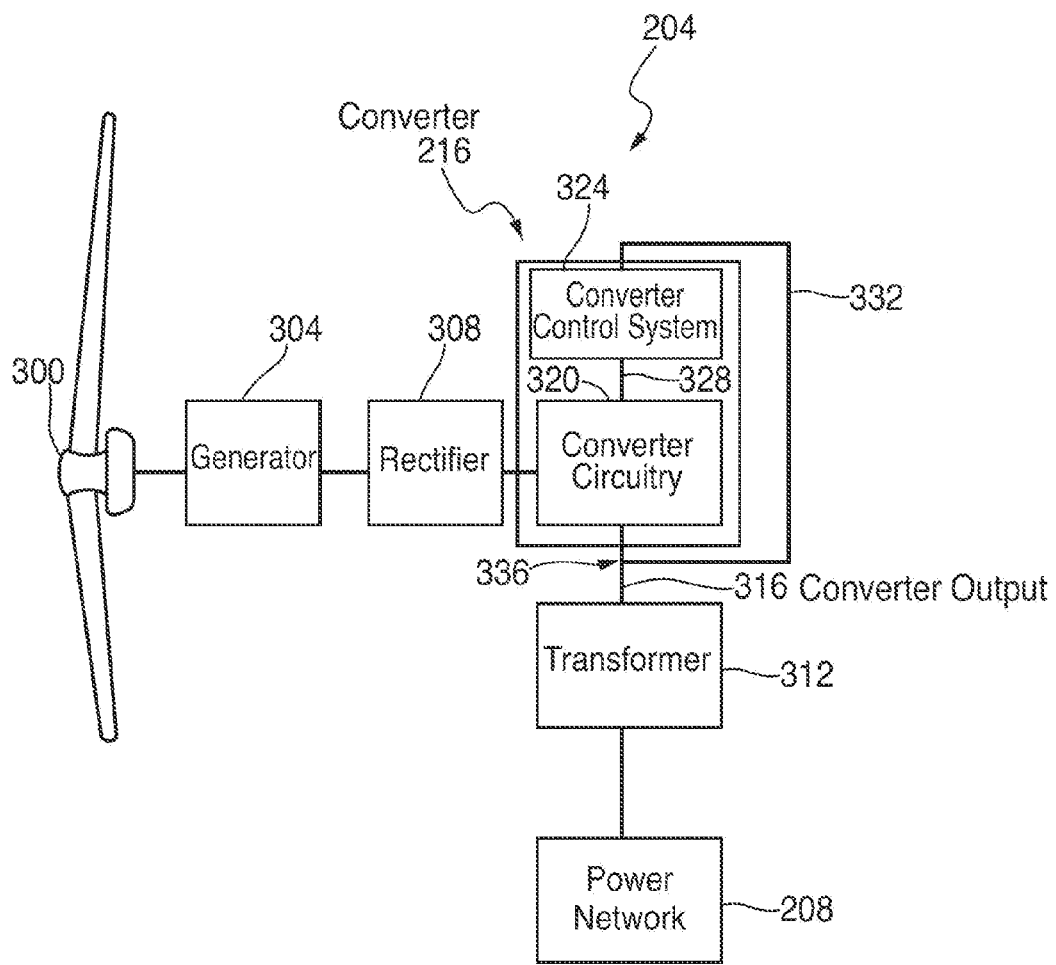
FIG. 3 is a partial schematic diagram of the WPU of FIG. 2.

Before describing an exemplary embodiment of power converter 216, for the sake of context FIG. 3 shows some of the mechanical and electrical components of a particular embodiment of WPU 204. In this embodiment, WPU 204 includes a wind turbine 300 that rotates in response to the wind. Wind turbine 300 is coupled to a generator 304, which converts the rotational energy of the wind turbine into electrical energy in AC form. A rectifier 308 converts the AC power produced by generator 304 to direct current (DC), which is then further conditioned by power converter 216 from DC to AC power at a frequency and phase angle appropriate for transmission onto power network 208 (FIG. 2). Power converter 216 is coupled to a transformer 312, which modifies the converter output 316 (i.e., voltage produced by WPU 204) to the voltage on utility grid 208.

Figure 1:
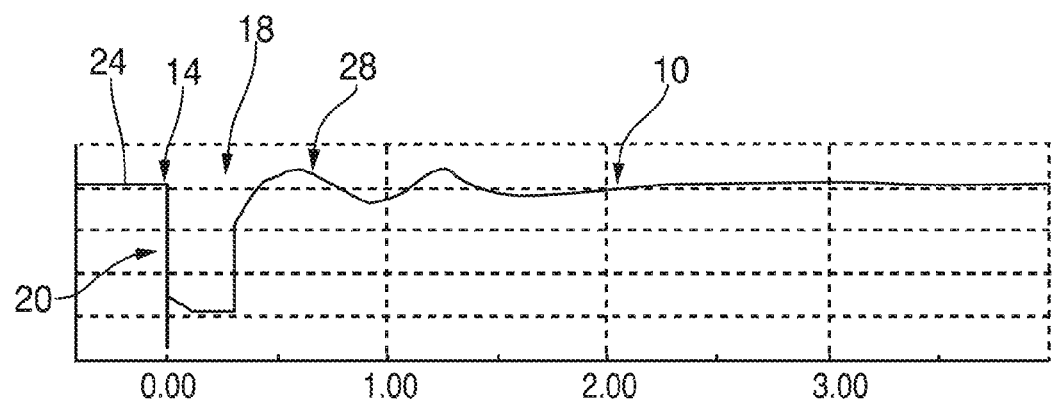
FIG. 1 is a graph showing a voltage level changes resulting from a fault on a power network.

Power converter 216 includes converter circuitry 320 and a control system 324 and is capable of regulating currents provided to power network 208 by following a set of reference currents generated by the control system. Power converter 216 is typically a current regulated power inverter. Converter circuitry 320 is electronically coupled to and controlled by control system 324 (an example of which is shown in detail in FIG. 4) using a command signal 328, which is a control signal based on the phase of the voltage on power network 208 (FIG. 2). Control system 324 is configured to essentially provide an estimate of the phase angle of the current at the time of recovery from a fault, for example time 16 in FIG. 1. As exemplified below, such estimate can be achieved by providing a phase tracking system that responds so slowly to voltage changes on power network 208 at all times of operation that it continues at about the same speed (frequency) during the fault, generally not being affected by the voltage disturbance. Such estimate can alternatively be provided by essentially freezing the value of command signal 328 to the value that exists when a voltage drop indicative of a ride-through event occurring on power network 208 (FIG. 2) is experienced. Each of these alternatives is described below in more detail, primarily in the context control system 324 utilizing a phase-locked loop (PLL) in its control scheme. Those skilled in the art, however, will appreciate that the functionality provided by a PLL (either hardware or software based) can be provided by other means, such as a delay-lock loop.

Figure 4:
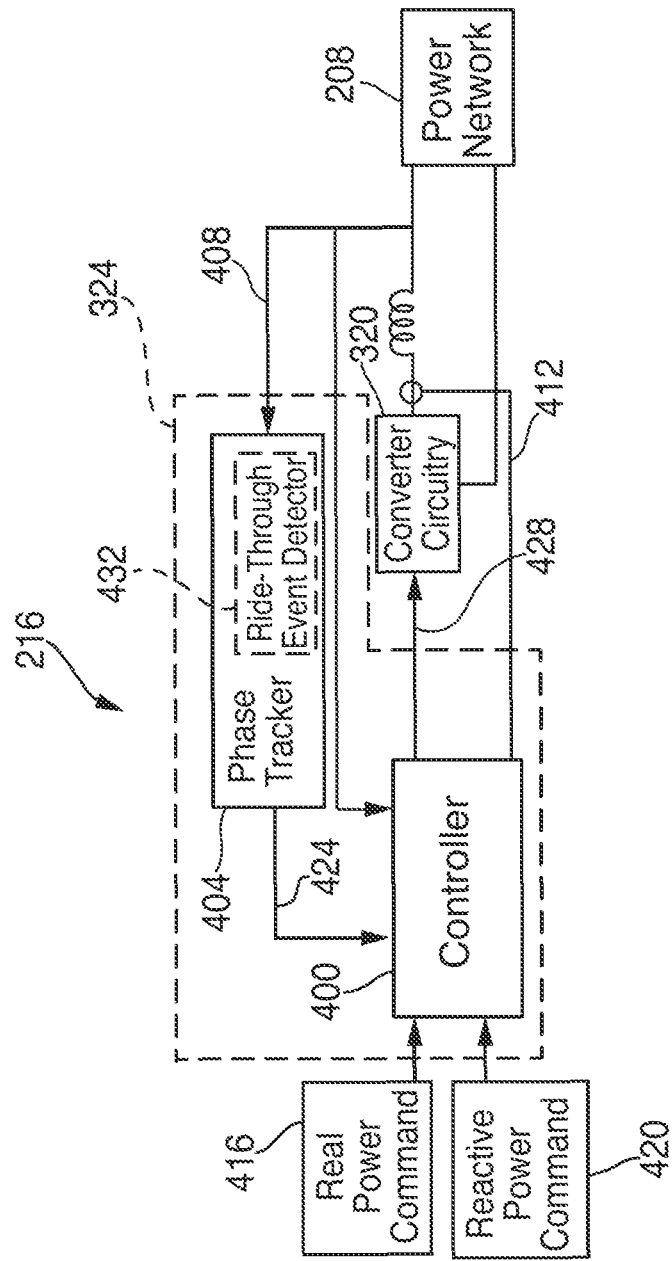
FIG. 4 is an electrical schematic diagram of the grid-connected power converter of FIG. 3.

Turning now to FIG. 4, this figure illustrates exemplary components of one implementation of control system 324 of FIG. 3. At a high level, control system 324 includes a controller 400 and a phase tracker 404. Controller 400 receives several input signals including, but not limited to, a network voltage signal 408 and a current signal 412 representative of the voltage and current at the output terminals of the WPU 204 or converter 216, respectively. Controller 400 also receives a real current command 416 and a reactive current command 420 from system level controls (not shown), as those skilled in the art will appreciate. Controller 400 further receives a controller phase reference signal 424 from phase tracker 404 that is used in an algorithm, along with the aforementioned signals and commands, to instruct converter circuitry 320 as to the proper phase and frequency of the current output sent to utility grid 208.

Typically, controller 400 implements control code in a digital processor or other digital device; however, those of ordinary skill in the art would recognize that the controller can alternatively be implemented using analog circuitry. In an alternative embodiment, controller 400 may be the controller described in U.S. Pat. No. 6,693,409 to Lynch et al. entitled "Control System For a Power Converter and Method of Controlling Operation of a Power Converter" or the controller described in U.S. Pat. No. 7,492,617 to Petter et al. entitled "Frequency Control and Power Balancing in Disturbed Power Inverter System and Method Thereof," which are incorporated herein by reference for their disclosure of inverter systems and methods that can be utilized with the features disclosed in the present disclosure.

In one embodiment, control system 324 is made to respond so slowly to changes in the frequency of the voltage on power network 208 at all times during operation that it is largely not affected by a voltage sag or drop. In the context of FIG. 4, phase tracker 404 can be designed to be slow at all times of its operation, i.e., not only during low(zero)-voltage ride through events, but also while tracking the frequency of the voltage when the network voltage is at its normal level. In the following examples, "nominal frequency tracking time constant" is defined as the time constant of phase tracker 404 when the network voltage is nominal. It is noted that this time constant drops proportionally with grid voltage during a low voltage event.

In one example, the present inventor has empirically found that a suitable definition of "slow" relative to the tracking of the frequency of the network voltage is that the response time of phase tracker, i.e., the nominal frequency tracking time constant, should be about ¼ to about 2 times the maximum ride-through fault period. In this example, the maximum ride-through fault period is defined as the maximum time that the voltage is below ⅓ of nominal for which the system is to stay connected. As those skilled in the art will appreciate, the ride-through fault time over voltage curve is typically defined by one or more utilities or other entities responsible for setting the operating parameters and criteria for the power network at issue, here, power network 208. For example, the maximum ride though fault period for FERC Order 661-A is about 1 second and in some codes as short as 0.3 seconds. Typically, fault disturbances with large voltage-phase shifts are short in duration, typically less than 100 ms and virtually always less than 500 ms. The present inventor has also empirically found that workable values of the nominal frequency tracking time constant for phase tracker 404 in this example range from about 25 ms to about 2 s. In one implementation, the response time is about 300 mS.

Figure 7:
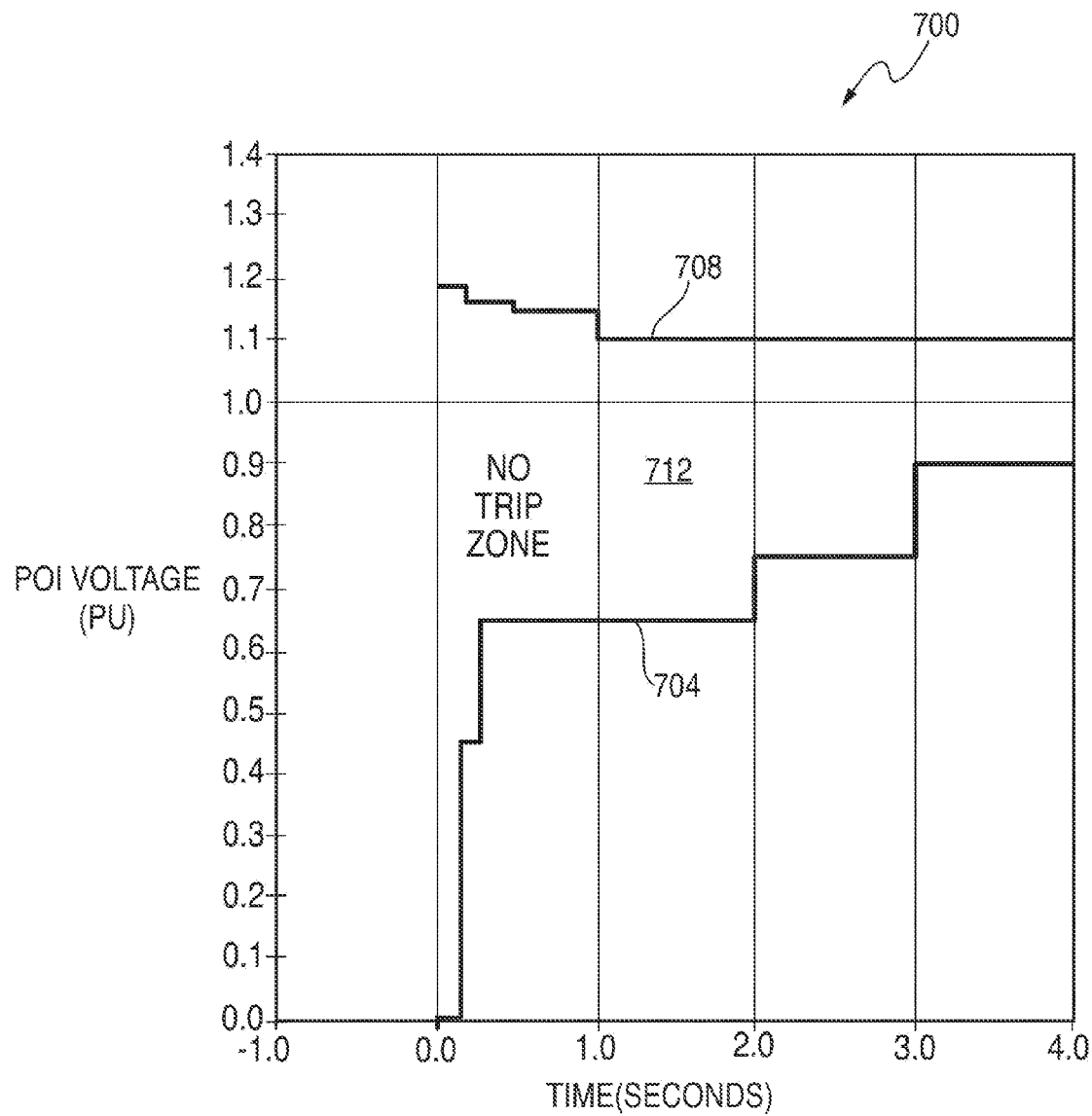
FIG. 7 is graph of point of interconnect voltage versus time illustrating exemplary voltage excursion ride-through requirements.

In another example, the present inventor has found that the nominal frequency tracking time constant should be from about 1 to about 5 times the length of the desired time that the system is to ride through a very low voltage event. For convenience, this time is referred to herein as the "very low voltage time," or "VLVT," for short. The VLVT is the time that the system needs to ride through at a level of less than about 15% to 20% of nominal voltage. To help with this definition, FIG. 7 shows a graph 700 illustrating exemplary voltage ride-through requirements. Those skilled in the art may recognize that graph 700 is taken from the 2009 FERC draft standard PRC-024-1. Graph 700 is a graph of voltage per unit (PU), with the voltage taken at the point of interconnect (POI), versus time, and shows both a low-voltage-event curve 704 and a high-voltage-event curve 708. The region between curves 704 and 708 is the no trip zone, or ride-through region 712. As seen from low-voltage-event curve 704, the VLVT of this example is 0.15 s, such that the nominal frequency tracking time constant according to the teaching of this example should be about 0.15 s to about 0.75 s, i.e., about 1 to about 5 times the VLVT, here 0.15 s.

Those skilled in the art will understand how to adjust the value of the nominal frequency tracking time constant of phase tracker 404 given the conditions and characteristics of the power network at issue, as well as the parameters of phase tracker. Generally the choice of the time constant is a tradeoff between fast response which is need for fast power changes during normal operation and slower response for good LVRT performance. Importantly, it is noted that this scheme of implementing slow tracking times is contrary to typical conventional power converter control schemes that use fast tracking speeds and various state machines to deal with ride-through requirements. It is noted that an augmentation to the disclosed slow-tracking scheme is to provide phase tracker 404 with the innate ability to slow its response time from an already slow value to a slower value in proportion to the voltage at the terminals of the wind turbine. A simple way of implementing this slowdown feature using a PLL is describe below in connection with FIG. 5.

As mentioned above, an alternative to making phase tracker 404 slow in tracking the network voltage is to configure the phase tracker to freeze the frequency of controller phase reference signal 424 to the value it has at substantially the time that a ride-through event is detected. For this feature, phase tracker 404 can be provided with a ride-through-event detector 432 designed and configured, for example, to detect via network voltage signal 408 when the network voltage has dropped below a preset level. The present inventor has empirically determined that values of the preset level useful in the context of this feature include values that fall in the range of about 25% to about 50% of the normal operating voltage level on the power network at issue, here, power network 208. That said, others may find values of the preset level outside of the range provided to be useful.

In one example, ride-through-event detector 432 is a voltage comparator that compares the voltage of network voltage signal 408 to a reference voltage set to the preset level just described. When the network voltage falls below the preset level, ride-through-event detector 432 triggers phase tracker 404 to freeze the frequency of controller phase reference signal 424 at its then-current value. One example of how this freezing can be achieved in the context of phase tracker 404 including a PLL is described below in connection with FIG. 5. That said, those skilled in the art should be able to devise alternative ways of achieving this freezing of frequency of controller phase reference signal 424. It is noted that this feature can be enhanced when the response time of phase tracker is relatively slow, for example, slow enough to keep phase reference signal 424 close to the value it has when power network 208 is operating at normal voltage levels over the time it takes ride-through-event detector 432 to detect a fault event and phase tracker 404 to freeze the phase reference signal. In this manner, controller phase reference signal 424, when frozen during the fault event, will have substantially the same value as it does during periods of normal network voltage. As those skilled in the art will appreciate, controller phase reference signal 424 can be unfrozen when the voltage recovers back above the preset level.

Figure 5:
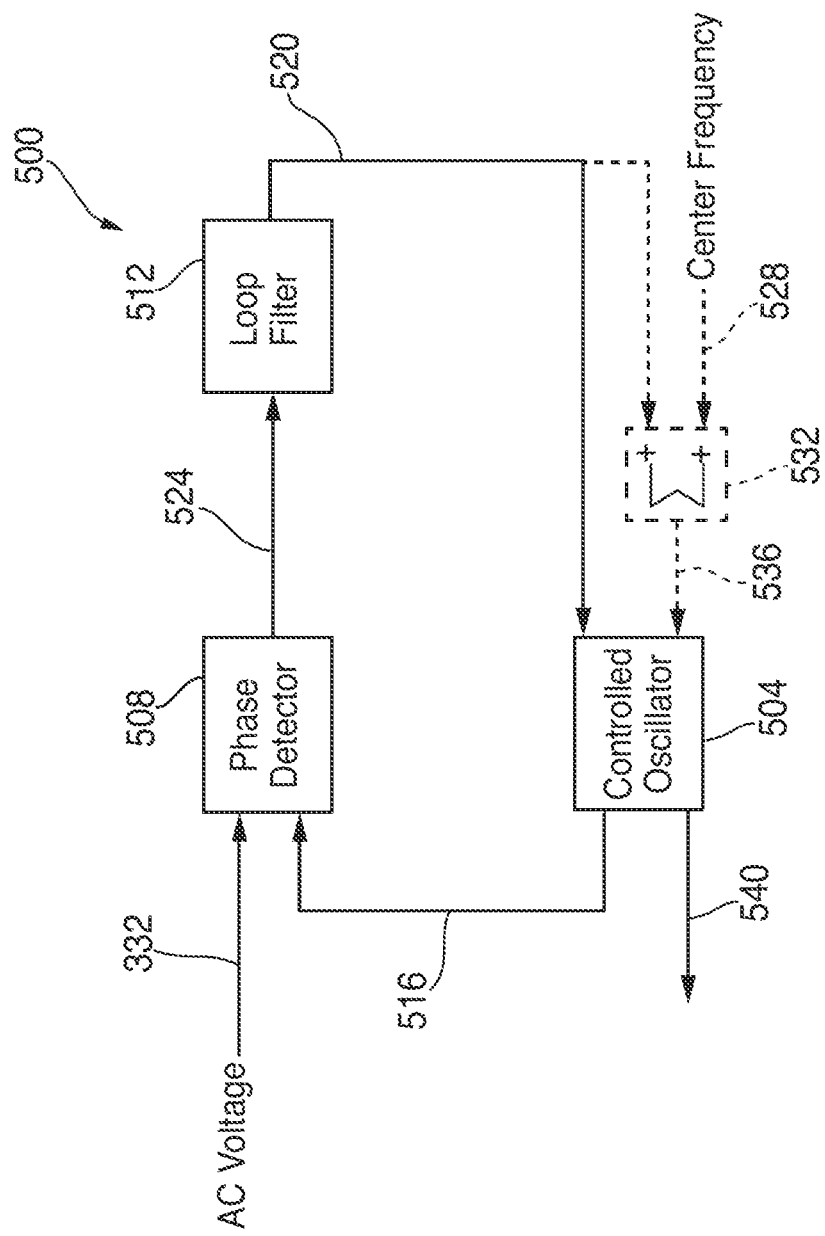
FIG. 5 is a schematic diagram of a phase locked loop (PLL) that can be used for the PLL of the power converter of FIGS. 3 and 4.

In one embodiment of control system 324, phase tracker 404 includes a PLL. FIG. 5 illustrates an exemplary PLL 500 suitable for use in phase tracker 404. Similar to controller 400, those skilled in the art that PLL 500 will typically be implemented in software, but can alternatively be implemented in hardware. As seen in FIG. 5, PLL 500 includes three primary components: a controlled oscillator 504; a phase detector 508; and a loop filter 512. As those skilled in the art will understand, controlled oscillator 504 generates an AC reference signal 516 as a function of a phase error signal 520. Phase detector 508 outputs a detector signal 524 that is a function of the phase difference between AC voltage signal 332 and AC reference signal 516. In one example, phase detector 508 is a multiplier that multiplies AC reference signal 516 and AC voltage signal 332 with one another. This simple type of phase error detector has the characteristic of the phase error being proportional to the amplitude of the voltage as well as the phase error. This is what gives the PLL the innate characteristic of having its frequency and phase tracking response time a function of the voltage level Detector signal 524 is then operated on by loop filter 512 to remove unwanted features of detector signal 524. In the case of the multiplier example of phase detector 508, loop filter 512 is a low-pass filter designed and configured to rid detector signal 514 of the double-frequency term that results from the multiplication. The output of loop filter 512 is phase-error signal 520.

In some embodiments, as illustrated in FIG. 5, PLL 500 can operate using an optional centering frequency signal 528 generated, for example, by operator-programmable hardware or software (not shown). In such embodiments, centering frequency signal 528 gives PLL 500 a reference point and maintains the output of loop filter 512 near zero. When optional centering frequency signal 528 is present, frequency error signal 520 is combined with the center frequency signal in summation circuit 532, and the resultant signal 536 is output to controlled oscillator 504. Controlled oscillator 504 also outputs a phase reference signal 540 that is the phase of the AC reference signal 516 used in the feedback loop to phase detector 508. When PLL 500 is used in control system 324 (FIGS. 3 and 4), phase reference signal 540 corresponds to controller phase reference signal 424, and controller 400 (FIG. 4) uses the controller phase reference signal to generate current commands 428 (FIG. 4), which include a real current waveform and a reactive current waveform, for converter circuitry 320 (FIGS. 3 and 4).

As described above, in one embodiment phase tracking system 404 (FIG. 4) is designed and configured to track the phase of the voltage on power network 208 slowly so as to largely keep controller phase reference signal 424 unaffected by a fast voltage sag or dip due to a ride-through fault voltage disturbance. In the context of PLL 500, this slowness can be achieved by selecting the appropriate gain constants and other operating parameters of the PLL. Those skilled in the art will readily understand how to tune the response time of PLL 500 according to the guidance provided above on response times of phase tracker 404 (FIG. 4) for a given PLL design. Those skilled in the art will also know how to tune the slow response time of PLL 500 to a given power system that converter control system 216 (FIGS. 2-4) will be a part of.

As also discussed above, phase tracker 404 of FIG. 4 can be enhanced by designing and configuring it to slow its response as a function of the network voltage. In the context of PLL 500 of FIG. 5, this can be achieved by making phase detector 508 an amplitude-sensitive phase detector such that its phase error output is a function of both phase error and voltage level. With a suitable amplitude-sensitive phase detector, the speed of PLL 500 would decrease with the decreased amplitude of the network voltage, represented by AC voltage 332, during the sag or drop thus slowing the response time to phase and frequency changes. Amplitude-sensitive phase detectors are known in the art, and, therefore, further details are not needed for those skilled in the art to implement PLL 500 with a suitable amplitude-sensitive phase detector for phase detector 508.

In an alternative embodiment of converter control system 324 (FIGS. 3 and 4) described above, phase tracker 404 (FIG. 4) is designed and configured so that once it detects that the network voltage on network 208 drops below a certain level, it maintains the frequency of controller phase reference signal 424 (FIG. 4) then current at substantially the time of the detection. In an exemplary embodiment, when phase tracker 404 is implemented as a PLL, such as PLL 500 of FIG. 5, the freezing of phase reference signal 540 (which, again, corresponds to controller phase reference signal 424 of FIG. 4 in the context of phase tracker 404) can be achieved by setting the value of either phase error signal 520 or detector signal 524 (FIG. 5) to zero upon detection of AC voltage 332 dropping below a preset value, which is described above in connection with FIG. 4). Setting phase error signal 520 or detector signal 524 to zero effectively holds the frequency of phase reference signal 540 at the frequency at the time of freezing. If the response time of PLL 500 is suitably slow as described above, the frequency of frozen phase reference signal 540 will be roughly the frequency that was present just prior to the occurrence of the fault that caused the sag or drop.

As those skilled in the art will readily appreciate, this switching of the value of phase error signal 520 or detector signal 424 from a "live" value to zero can be achieved in a variety of ways. For example, if PLL 500 is executed with hardware, a multiplexer (not shown) that selects between a live value of phase error signal 520 and a constant-zero signal as a function of a selection signal, for example from ride-through-event detector 432 (FIG. 4) could be added between loop filter 512 and controlled oscillator 504. Alternatively, if PLL 500 is implemented in software, a register that holds a value of phase error signal could be temporarily loaded with the value of zero during the freezing period. Those skilled in the art will readily understand how to implement these and other schemes for temporarily setting the value of phase error signal 520 to zero in response to a triggering event, such that further explanation is not necessary for those skilled in the art to make and use this aspect of the present invention. Once phase error signal 520 is set to zero in response to a voltage ride-through event, similar techniques can be used for returning phase error signal to live values when appropriate. Similar schemes could be applied to detector signal 424, as well.

As noted previously, after receiving phase reference signal 540 from PLL 500 of FIG. 5 (that corresponds to controller phase reference signal 424 of FIG. 4), control system 324 (FIG. 3) generates command signal 328 that instructs converter circuitry 320 to deliver a current waveform at a particular phase relative to the voltage existing on utility grid 208. Command signal 328 may be generated digitally using look-up tables, using analog circuitry, or it may be a software routine executing, for example, a trigonometric sine and cosine function. For the PLL implementation described relative to FIG. 5, the strategy is to let the AC current command phase be controlled by the phase of phase reference signal 540. Using one or more of the techniques described above, phase tracker 404 (FIG. 4) effectively estimates the value of the phase of the network voltage during a ride-through-fault event. Thus, when power network 208 returns to normal operation after the event, WPU 204 will already be delivering current to power network 208 at a phase and frequency that are very close to the recovery phase and frequency of the voltage on the network.

Control system 324 (FIGS. 3 and 4) can be relatively simple or very complex, incorporating many functions of wind-turbine control. Control system 324 may be an independent circuit simply for the functions related to the technique of the present invention or may simply be a part of the converter or some other component of the wind turbine system or aspects of the converter control circuit spread out among components. Control system 324, as shown in FIG. 4, may be embodied as a physical hardware component or it can be implemented in software using, for example, a microprocessor.

It is to be noted that any one or more of the aspects and embodiments described herein may be conveniently implemented using one or more machines (e.g., one or more computing devices that are utilized as a user computing device for an electronic document, one or more server devices, such as a document server) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk (e.g., a conventional floppy disk, a hard drive disk), an optical disk (e.g., a compact disk "CD", such as a readable, writeable, and/or re-writable CD; a digital video disk "DVD", such as a readable, writeable, and/or rewritable DVD), a magneto-optical disk, a read-only memory "ROM" device, a random access memory "RAM" device, a magnetic card, an optical card, a solid-state memory device (e.g., a flash memory), an EPROM, an EEPROM, and any combinations thereof. A machine-readable medium, as used herein, is intended to include a single medium as well as a collection of physically separate media, such as, for example, a collection of compact disks or one or more hard disk drives in combination with a computer memory. As used herein, a machine-readable storage medium does not include a signal and information carried on a carrier wave.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a personal digital assistant "PDA", a mobile telephone, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
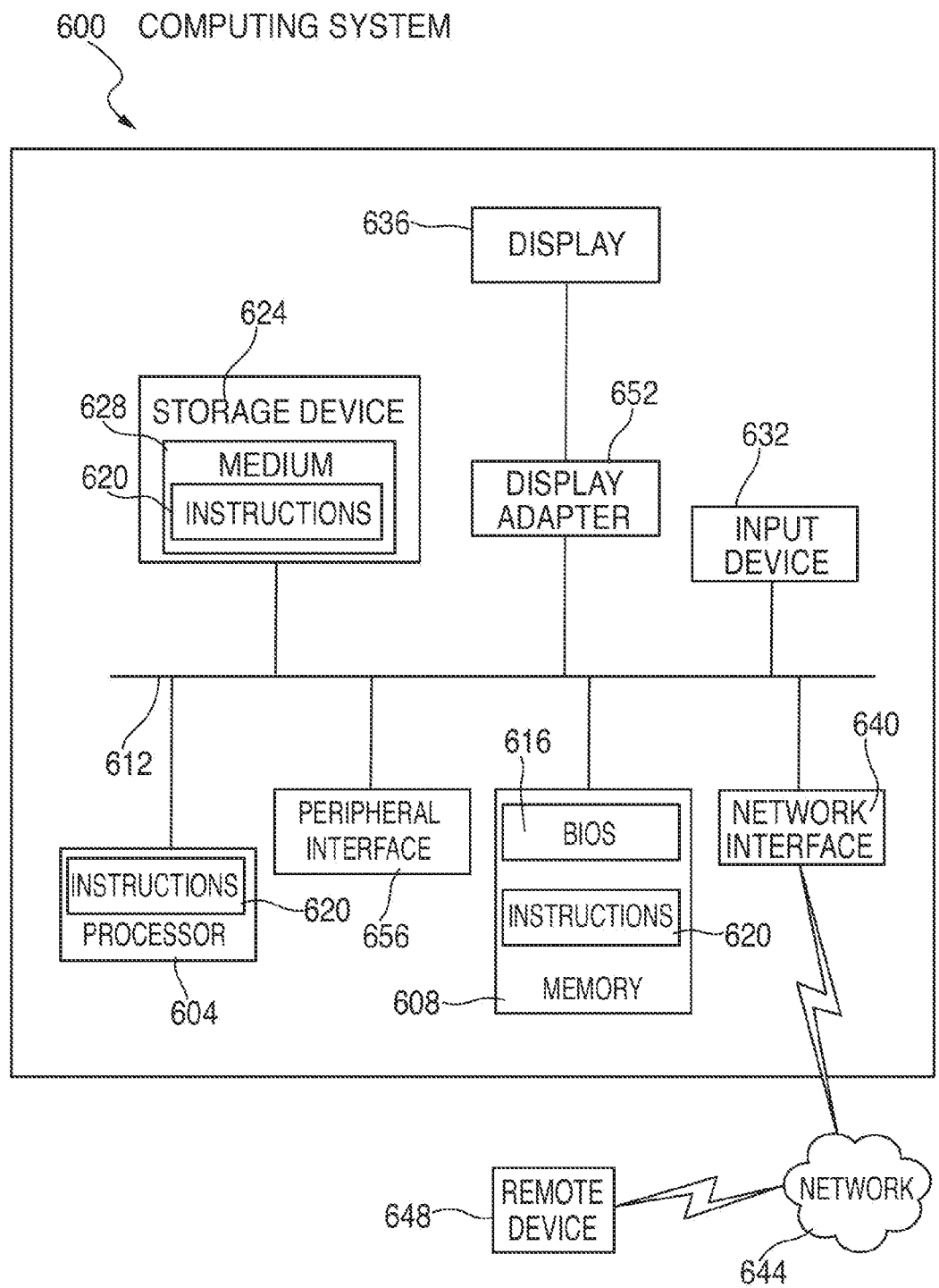
FIG. 6 is a block diagram of computing environment according to an embodiment of the present invention.

FIG. 6 shows a diagrammatic representation of one embodiment of a computing device in the exemplary form of a computer system 600 within which a set of instructions for causing a control system, such as converter control system 324 of FIG. 3, to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable storage medium 628 may provide nonvolatile and/or volatile storage of machine-readable instructions, data structures, program modules, and/or other data for computer system 600. In one example, software 620 may reside, completely or partially, within machine-readable storage medium 628. In another example, software 620 may reside, completely or partially, within processor 604. It is noted that the term "machine-readable storage medium" does not include transitory signals, such as carrier-wave based signals and carrierless signals.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640 may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide a graphical representation of a utility resource, a location of a land parcel, and/or a location of an easement to a user. In addition to a display device, a computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A machine-readable storage medium containing machine-executable instructions for performing a method of controlling an alternating-current (AC) output of a power converter connected to an AC power network subject to a voltage fault that causes a network voltage on the AC power network to drop below a normal operating level during a fault period, said machine-executable instructions comprising:
   a first set of machine-executable instructions for estimating a phase angle of a voltage anticipated to be present on the AC power network when the network voltage recovers from the voltage fault; and
   a second set of machine-executable instructions for controlling a current of the AC output during the voltage fault as a function of the phase angle estimated;
   wherein the network voltage has an amplitude and said first set of machine-executable instructions includes machine-executable instructions for tracking the phase with a response time and machine-executable instructions for changing the response time in inverse proportion to the amplitude of the network voltage.

2. A machine-readable storage medium according to claim 1, wherein the power converter is required to remain connected to the AC power network during a maximum ride-through fault period having a very low voltage time, and said first set of machine-executable instructions includes machine-executable instructions for tracking a phase of the network voltage with a time constant equal to about 1 times the very low voltage time to about 5 times the very low voltage time.

3. A machine-readable storage medium according to claim 1, wherein the power converter is required to remain connected to the AC power network for a maximum ride-through fault period, and said first set of machine-executable instructions includes machine-executable instructions for tracking a phase of the network voltage with the response time being about ¼ to about 2 times the maximum ride-through fault period.

4. A machine-readable storage medium according to claim 1, wherein the response time is at least 25 ms.

5. A machine-readable storage medium according to claim 4, wherein the response time is at least 100 ms.

6. A machine-readable storage medium according to claim 5, wherein the response time is at least 1 s.

7. A machine-readable storage medium according to claim 1, wherein said machine-executable instructions for changing the response time includes machine-executable instructions for changing the response time using a software-implemented phase-locked loop having an amplitude-sensitive phase detector.

8. A machine-readable storage medium according to claim 1, wherein said first set of machine-executable instructions includes machine-executable instructions for estimating the phase angle using a software-implemented phase-locked loop.

9. A machine-readable storage medium according to claim 1, wherein said first set of machine-executable instructions includes machine-executable instructions for executing an estimating method that utilizes operating parameters that remain substantially the same during, before, and after the fault period.

10. A machine-readable storage medium containing machine-executable instructions for performing a method of controlling an alternating-current (AC) output of a power converter connected to an AC power network having a frequency and subject to a voltage fault that causes a network voltage on the AC power network to drop below a normal operating level during a fault period to be ridden through, wherein the power converter is required to remain connected to the AC power network during a maximum ride-through fault period having a very low voltage time, said machine-executable instructions comprising:

a first set of machine-executable instructions for estimating a phase angle of a voltage anticipated to be present on the AC power network when the network voltage recovers from the voltage fault; and a second set of machine-executable instructions for controlling a current of the AC output during the voltage fault as a function of the phase angle estimated;

wherein said first set of machine-executable instructions includes machine-executable instructions that assume that the frequency of the AC power network does not change during the fault period by utilizing a frequency tracking time constant greater than the very low voltage time.

11. A machine-readable storage medium according to claim 10, wherein said first set of machine-executable instructions includes machine-executable instructions for estimating the phase angle using a software-implemented phase-locked loop.

12. A machine-readable storage medium according to claim 10, wherein said first set of machine-executable instructions includes machine-executable instructions for executing an estimating method that utilizes operating parameters that remain substantially the same during, before, and after the fault period.

13. A machine-readable storage medium according to claim 10, wherein the frequency tracking time constant is equal to about 1 times the very low voltage time to about 5 times the very low voltage time.

14. A machine-readable storage medium according to claim 10, wherein said first set of machine-executable instructions includes machine-executable instructions for tracking a phase of the network voltage with a response time of about ¼ to about 2 times the maximum ride-through fault period.

15. A machine-readable storage medium according to claim 10, wherein said first set of machine-executable instructions includes machine-executable instructions for tracking a phase of the network voltage with a response time of at least 25 ms.

16. A machine-readable storage medium according to claim 15, wherein the response time is at least 100 ms.

17. A machine-readable storage medium according to claim 16, wherein the response time is at least 1 s.

* * * * *